United States Patent [19]

Matano et al.

[11] Patent Number: 4,572,902

[45] Date of Patent: Feb. 25, 1986

[54] METHOD FOR PRODUCING CERAMIC SINTERED BODY OF A $Si_3N_4$-SIC SYSTEM

[75] Inventors: Taiji Matano; Haruyuki Ueno; Kazushige Fukuda, all of Kitakyushu, Japan

[73] Assignee: Kurosaki Refractories Co., Ltd., Kitakyushi, Japan

[21] Appl. No.: 698,940

[22] Filed: Feb. 7, 1985

[30] Foreign Application Priority Data

Feb. 10, 1984 [JP] Japan .................................. 59-23912

[51] Int. Cl.$^4$ ............................................. C04B 35/58
[52] U.S. Cl. ....................................... 501/97; 264/82; 423/344; 501/92
[58] Field of Search ...................... 501/92, 97; 264/82, 264/66, 65; 423/344

[56] References Cited

FOREIGN PATENT DOCUMENTS

| 52-073907 | 6/1977 | Japan . | |
|---|---|---|---|
| 57-123868 | 8/1982 | Japan | 501/97 |
| 59-88372 | 5/1984 | Japan | 501/97 |
| 1432559 | 4/1976 | United Kingdom | 501/97 |

*Primary Examiner*—Helen M. McCarthy
*Attorney, Agent, or Firm*—James J. Ralabate

[57] ABSTRACT

After sintering, ceramic body of $Si_3N_4$-SiC is heat-treated at 500°–1500° C. in atmosphere of gas mixture of chlorine and nitrogen whereby SiC is converted into silicon chloride which in turn is nitrided to form $Si_3N_4$ in the pores of the ceramic body to provide closed pore structure. Gas mixture may contain oxygen. Heat treatment may be conducted in pressurized atmosphere of gas mixture.

3 Claims, No Drawings

METHOD FOR PRODUCING CERAMIC SINTERED BODY OF A SI₃N₄-SIC SYSTEM

BACKGROUND OF THE INVENTION

1. Technical Field of the Invention

This invention relates to a method for producing ceramics of a $Si_3N_4$-SiC system having a closed structure.

2. Prior Arts and Its Problems

It is known that ceramic having a $Si_3N_4$-SiC system has a defect that it has many open pores in the surface layer after sintering so that it has poor resistance to oxidation at high temperature and deteriorates various properties.

For preventing such deterioration of properties, for example, as disclosed in the Japanese Patent Publication No. 73907/1977, it has been proposed to close open pores by repeating the process which comprises impregnating pores with an organic silicon compound and subsequent heating.

However, even if SiC can be embedded into open pores by such process, $Si_3N_4$ does not inter-react with SiC so that it is hardly possible to close the gap among $Si_3N_4$. Accordingly, the deterioration of properties at high temperature cannot be prevented.

SUMMARY OF THE INVENTION

The Object of the Invention

The present invention provides a method for producing ceramic sintered body of a $Si_3N_4$-SiC system which can resolve the above-mentioned problem of the conventional processes, wherein the ceramic sintered body has a closed pore structure and improved resistance to oxidation at high temperature.

DETAILED DESCRIPTION OF THE INVENTION

Composition of the Invention

The present invention discloses a method for producing ceramics having a $Si_3N_4$-SiC system characterized in that the method includes a process in which ceramic sintered body of a $Si_3N_4$-SiC system is heat-treated in the atmosphere of the gas mixture made of chlorine gas and nitrogen gas at the temperature range of 500°–1500° C., after sintering SiC of ceramic is converted into active chloride by chlorine contained in the atmosphere and the produced chloride is further nitrided by nitrogen contained in the atmospheric gas to form $Si_3N_4$ and accordingly to close pores of the structure.

When the content of chlorine gas in the above-mentioned gas mixture exceeds 80% in volume, after SiC is chemically reacted to produce chloride, nitrogen necessary for nitriding such chloride cannot be sufficiently supplied. Furthermore, when the content of chlorine gas is less than 0.1% in volume, chlorine for chemical reaction with SiC cannot be sufficiently supplied. Accordingly the content of chlorine gas in the gas mixture must be within the range of 0.1–80% in volume.

When the above-mentioned gas mixture contains oxygen and other oxidizing gases, the heat time to close the structure is shortened and this is advantageous in view of saving of heat energy. Namely, when using the gas mixture containing nitrogen and chlorine, SiC reacts with $Cl_2$ and the C which is produced when the chloride is also formed into chloride such as $CCl_4$. However, such chloride is discharged from the structure slowly. In this respect, when the gas mixture contains oxygen and other oxidizing gases, the C changes to CO or $CO_2$ gas which readily moves outside the structure. However, when the content of oxygen gas exceeds 50% in volume, the silicon oxy nitride and $SiO_2$ are considerably produced and silicon nitride cannot have a closed structure. Accordingly, the content of oxygen gas must be less than 50% in volume.

The temperature range of 500°–1500° C. is preferable for heat treatment of the ceramic sintered body of $Si_3N_4$-SiC system in the flow of the above-mentioned gas mixture. SiC does not react actively with chlorine at the temperature of 500° C. and less and even if the chloride is produced, the $Si_3N_4$ formation by nitrogen does not occur at the subsequent step. Further when the temperature is 1500° C. and more, $Si_3N_4$ in the matrix starts to decompose partially and the physical properties of the produced sintered body are not improved and not effective in view of saving of heat energy.

The effect of closing pores of a structure according to the present invention is enhanced by conducting the heat treatment in the pressurized atmosphere of the above-mentioned gas mixture. Namely, in the pressurized atmosphere, the dispersion of the chloride which is produced from chlorine and reacts easily or nitrogn gas is restricted so that the density of $Si_3N_4$ produced by nitriding reaction is improved. However, it has been confirmed by the experiment that when the atmospheric pressure exceeds 20 $kg/cm^2$, the effect saturates.

According to the present invention, the method for producing ceramic sintered body includes a process wherein ceramic sintered body of a $Si_3N_4$-SiC system is heat-treated in the atmosphere of the gas mixture containing chlorine and nitrogen with a special condition first to chemically react SiC in the structure with chlorine and then to form chloride having a reaction activity in pores. Secondly, the formed chloride is reacted with nitrogen contained in the atmosphere to form $Si_3N_4$ in pores of the ceramic body. As the result, the closed structure can be obtained.

EXAMPLES

The advantage according to the present invention is explained hereinbelow in detail by examples.

EXAMPLE 1

A sample (20 mm×10 mm×5 mm) of ceramic sintered body containing 95% by weight of $Si_3N_4$ and 5% by weight at SiC was heat-treated in the flow of the gas mixture shown in Table 1 at the temperature range of 500° C.–1600° F. for 10 hours. The apparent porosities before and after the heat treatment are shown in Table 1. From Table 1, it is recognized that the closed structure cannot be expected when chlorine gas contained in the gas mixture is 0.1% in volume and less, or when it exceeds 80% in volume and the temperature of heat treatment exceeds 1500° C.

EXAMPLE 2

The same sample as in Example 1 was heat-treated using the gas mixture containing 80% in volume of nitrogen gas and 20% in volume of chlorine gas which is further added with oxygen at the ratio shown in Table 2 at 1000° C. for 5 hours and the influence on the apparent porosity of the structure was examined. The results are shown in Table 2.

From the results in Table 2, it has been found that the maximum amount of oxygen which can be added to 100% in volume of the gas mixture containing nitrogen and chlorine is 50% and if the oxygen amount is more than 50% in volume, the oxygen is not effective for closing a structure.

EXAMPLE 3

The same sample as in Example 1 was heat-treated under pressure shown in Table 3 using the gas mixture containing 90% in volume of nitrogen gas, 1% in volume of chlorine gas, and 9% in volume of oxygen gas and the charge of the apparent porosity before and after treatment was examined. The results are shown in Table 3.

As the result, it has been found that the heat treatment in the pressurized atmosphere is effective for closing pores of a structure. It has been also found that as the pressure approaches to 50 kg/cm², the effectiveness becomes saturated.

As mentioned above, from the results of Example 1–3, it is confirmed that ceramic sintered body of the $Si_3N_4$-SiC system of the present invention can have the closed structure by heat treatment in the gas mixture containing chlorine and nitrogen or in addition to them, oxygen.

TABLE 1

| Number of Sample | Gas Composition (% in volume) | | Apparent Porosity (%) | | Treatment Temperature (°C.) |
|---|---|---|---|---|---|
| | Chlorine Gas | Nitrogen Gas | Before Treatment | After Treatment | |
| 1 | 0.05 | 99.95 | 15.5 | 10.0 | 1500 |
| 2 | 0.1 | 99.9 | 15.5 | 4.5 | 1500 |
| 3 | 1 | 99 | 15.5 | 1.8 | 1400 |
| 4 | 10 | 90 | 15.5 | 0 | 1100 |
| 5 | 20 | 80 | 15.5 | 3.0 | 1000 |
| 6 | 80 | 20 | 15.5 | 5.0 | 500 |
| 7 | 90 | 10 | 15.5 | 16.0 | 900 |
| 8 | 10 | 90 | 15.5 | 14.0 | 1600 |

TABLE 2

| Number of Sample | Ratio of Added Oxygen (% in volume) | Apparent Porosity (%) | |
|---|---|---|---|
| | | Before Treatment | After Treatment |
| 9 | 10 | 15.5 | 0 |
| 10 | 20 | 15.5 | 0.5 |
| 11 | 50 | 15.5 | 3.5 |
| 12 | 60 | 15.5 | 8.0 |

TABLE 3

| Number of Sample | Pressure in Furnace (kg/cm²) | Apparent Porosity (%) | |
|---|---|---|---|
| | | Before Treatment | After Treatment |
| 13 | 5 | 15.5 | 0.9 |
| 14 | 20 | 15.5 | 0.5 |
| 15 | 40 | 15.5 | 0.2 |
| 16 | 50 | 15.5 | 0.1 |

What is claimed is:

1. A method for producing ceramics having a closed pore structure from a sintered body of a $Si_3N_4$-SiC system which includes a process for heating ceramic sintered body in an atmosphere of a flowing gas mixture containing 0.1–80% in volume of chlorine and balance nitrogen gas at the temperature range of 500°–1500° C. after sintering whereby SiC is chemically reacted to produce silicon chloride which in turn is nitrided to form $Si_3N_4$ in the pores.

2. The method according to claim 1, wherein said gas mixture contains equal to or less than 50% in volume of oxygen gas.

3. The method according to claim 1, wherein said atmosphere of the gas mixture is a pressurized atmosphere of 50 kg/cm² and less.

* * * * *